(12) United States Patent
Bergmans et al.

(10) Patent No.: US 6,288,859 B1
(45) Date of Patent: Sep. 11, 2001

(54) DEVICE FOR WRITE COMPENSATION IN MAGNETIC-MEDIA RECORDING

(75) Inventors: Johannes W. M. Bergmans; Johannes O. Voorman, both of Einhoven (NL); Steven L. Brittenham, Boise, OH (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/257,082

(22) Filed: Feb. 24, 1999

Related U.S. Application Data

(63) Continuation-in-part of application No. 08/909,919, filed on Aug. 12, 1997, now Pat. No. 6,091,558.

(30) Foreign Application Priority Data

Feb. 26, 1998 (EP) .................................................. 98200606

(51) Int. Cl.$^7$ ........................................................ G11B 5/09
(52) U.S. Cl. ................................................ 360/46; 360/45
(58) Field of Search .................................... 360/45, 46

(56) References Cited

U.S. PATENT DOCUMENTS

| | | | |
|---|---|---|---|
| 4,432,024 | * | 2/1984 | Eguchi .................................... 360/45 |
| 4,607,295 | * | 8/1986 | Uno ........................................ 360/45 |
| 4,964,107 | * | 10/1990 | Galbraith et al. ..................... 368/120 |
| 5,325,241 | * | 6/1994 | Mattison et al. ....................... 360/45 |
| 6,091,558 | * | 7/2000 | Voorman et al. ....................... 360/46 |

FOREIGN PATENT DOCUMENTS

WO9810420    3/1998  (WO) ........................... G11B/20/10

\* cited by examiner

*Primary Examiner*—David Hudspeth
*Assistant Examiner*—Dan I. Davidson
(74) *Attorney, Agent, or Firm*—Edward W. Goodman

(57) ABSTRACT

A device for write precompensation of data signals to be recorded on a magnetic medium, has an input for receiving input data signals and an output for supplying the output signals to be recorded, at least a plurality of the signal transitions in these output data signals being delayed with respect to the corresponding signal transitions in the input data signal, the signal path between the input and the output including a series arrangement of a filter circuit and a hysteresis circuit, the hysteresis circuit receiving the output signal of the filter circuit and supplying a binary signal as its output signal. This write precompensation device simply enables allowance to be made for the influence of a large number of preceding symbol values on a transition to be recorded. When the device is combined with a known write compensation device it suffices to use a simple filter.

5 Claims, 2 Drawing Sheets

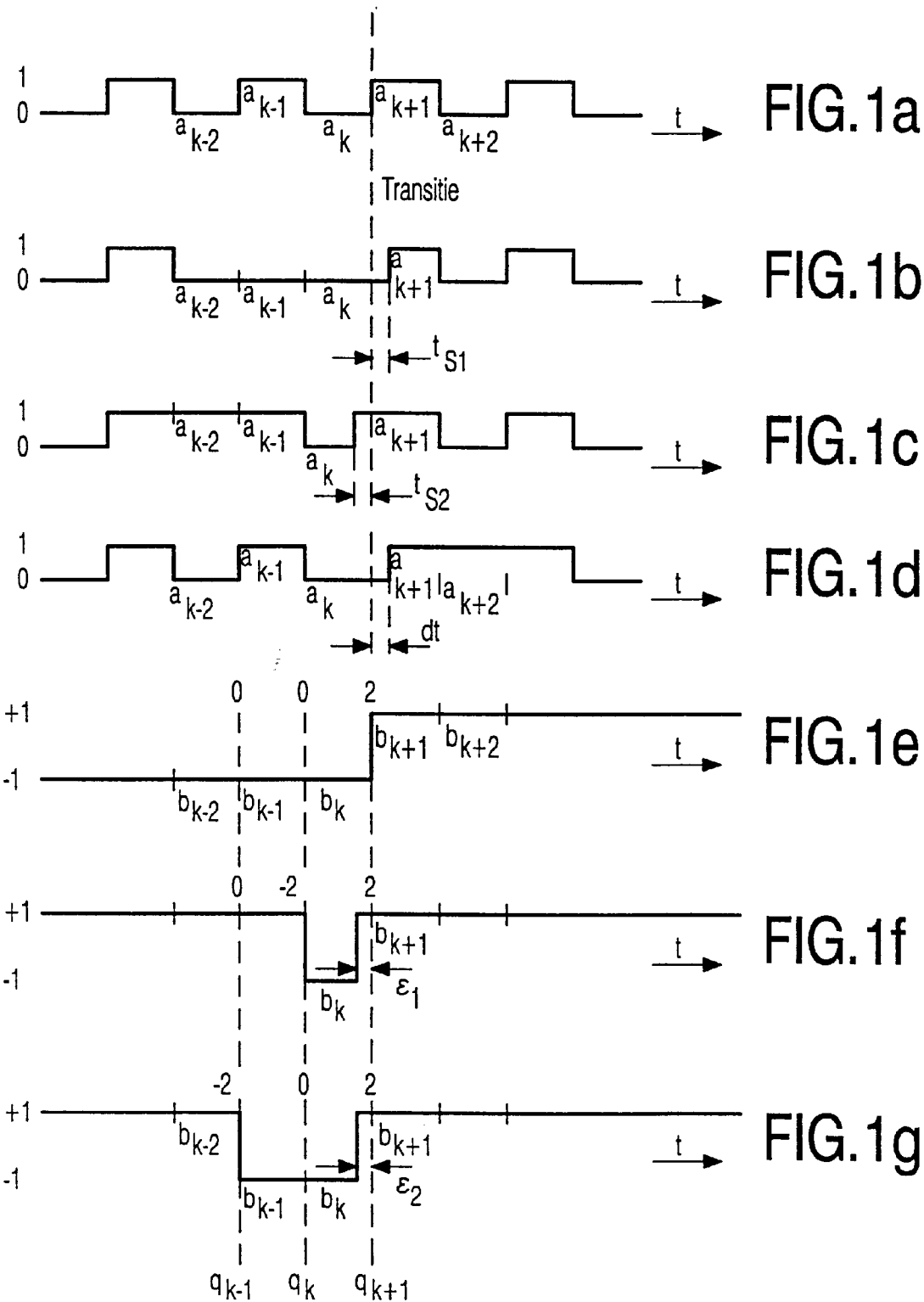

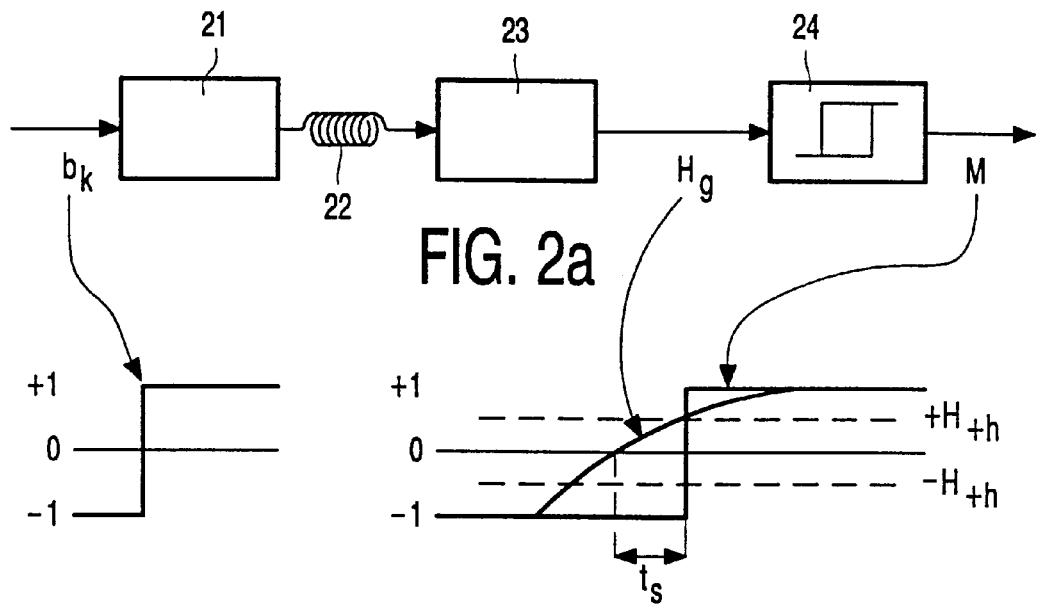
FIG. 2a
FIG. 2b
FIG. 2c
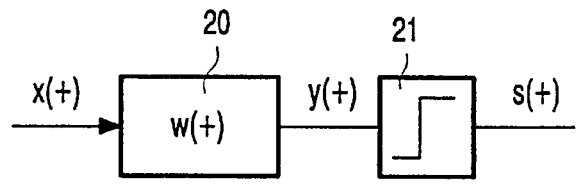
FIG. 3
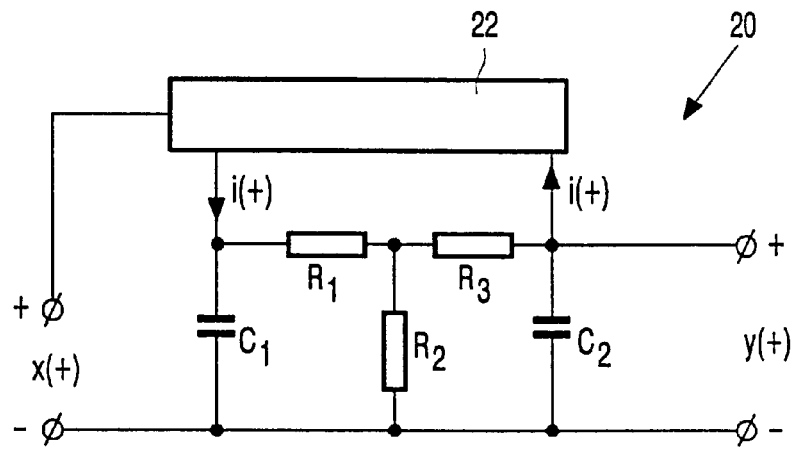
FIG. 4

DEVICE FOR WRITE COMPENSATION IN MAGNETIC-MEDIA RECORDING

CROSS REFERENCE TO RELATED APPLICATIONS

This is a continuation-in-part application of U.S. patent application Ser. No. 08/909,919, filed Aug. 12, 1997, now U.S. Pat. No. 6,091,558.

BACKGROUND OF THE INVENTION

1. Field of the Invention

The invention relates to a device for write precompensation of data signals to be recorded on a magnetic medium, the device having an input for receiving input data signals and an output for supplying the output signals to be recorded, at least a plurality of the signal transitions in these output data signals being delayed with respect to the corresponding signal transitions in the input data signal.

When certain data patterns occur during high-density data recording on magnetic media, non-linear bit shifts arise. These bit shifts are primarily caused by demagnetization effects, i.e., as a result of the fact that the magnetic medium 'opposes' the recording of a change of sign in the bit stream, particularly when a plurality of bits of the same sign precede one bit of an opposite sign. This effect manifests itself in that a change of sign or transition is recorded too late or too early, which results in bits being recorded which are too short or too long, respectively.

Another cause of non-linear bit shifts is the limited bandwidth of the recording channel. In the present description, a recording channel is to be understood to mean the signal path up to and including the write head, which also includes the write amplifier and the transformation of an electric input signal into a magnetic output signal in the write head. A data transition causes a comparatively slow change of the magnetic field in the write head by which the signals are recorded on the magnetic medium. The magnetization of the medium is not reversed and the transition is not recorded until the magnetic field strength exceeds a given threshold value. At high data rates, the total response of the magnetic field in the head to a signal transition extends over many bit intervals and thereby affects the recording of the transitions of many subsequent bits. In practice, it has been found that this effect can give rise to transitions being shifted with respect to one another by 20% or more of a bit interval.

Such inaccuracies in the positions of transitions relative to one another as a result of non-linear bit shifts are highly undesirable, particularly at high recording and read densities, because the reliability of the bit detection in the read signal is then reduced considerably.

2. Description of the Related Art

It is known that non-linear bit shifting as a result of demagnetization effects can be prevented, at least partly, by the use of write precompensation, which means that a sign change is either advanced or postponed depending on the values of a number of preceding bits. To this end, it is also known to consider either only the last preceding bit, a so-called first-order compensation, or the last two preceding bits, a so-called second-order compensation.

U.S. Pat. No. 4,607,295 describes a device comprising a transversal filter and by means of which, depending on the sign of two preceding bits, a choice is made for not delaying a bit to be recorded or for delaying this bit by a first or a second fixed delay.

U.S. Pat. No. 4,964,107 describes a device by means of which, depending on the sign of two preceding bits, it is decided to delay or not to delay the bit to be recorded. The selected delay then also depends on the position where the data is recorded on a magnetic disc, for which a choice can be made from eight delay values.

Finally, U.S. Pat. No. 5,325,241 describes a write precompensation device where the output voltage of an integrator formed by a capacitance is compared with three voltage values. Depending on which of the three voltage values is equal to the integrator voltage, a bit to be recorded is not delayed, is delayed by a first time interval or is delayed by a second time interval.

A disadvantage of these known write precompensation devices is that they only allow a choice from a very limited number of delay values for the compensation of non-linear bit shifts as a result of demagnetization effects, allowance being made for only a very limited number of preceding bits.

The article "Considerations for High-Data-Rate Recording With Thin-Film Heads" by R. Wood, M. Willians and J. Hong in IEEE Trans. Magn., Vol 26, No. 6, pp. 2954–2959, November 1990, describes that the limited bandwidth of the recording channel leads to bit shifts similar to the demagnetization effects. This is illustrated particularly by FIG. 9 of this article.

The article "Write current equalization for high speed digital magnetic recording" by T. Kato, R. Arai and S. Takanami in IEEE Trans. Magn., Vol. MAG-22, No. 5, pp. 1212–1214, September 1986, describes the problem of non-linear bit shifts as a result of the limited bandwidth of the recording channel, particularly as a result of the self-inductance of the write head. As a solution, it is proposed to use a filter which emphasizes the high frequencies. However, a disadvantage of this solution is that it can be used only at low bit rates. This can be explained as follows. The magnetic flux generated by the write head is proportional to the write current I. The write head comprises a coil having a self-inductance L, as a result of which the required write voltage is initially given by $V=L \cdot dI/dt$. At an increasing bit rate, $dI/dt$ will increase and, as a consequence, the required write voltage will also increase. In IC technology, this voltage is limited to 5 to 8 V, and this limitation dictates the maximum attainable bit rate during writing. In general, the use of a write equalizer of the type described in said article cannot palliate this limitation and, in practice, write equalization can therefore be used only at comparatively low bit rates.

The article "High data rate magnetic recording in a single channel" by C. H. Coleman et al. in the Journal of the Institution of Electronic and Radio Engineers, Vol. 55, No. 6, pp. 229–236, June 1995, also describes the problem of the slow response of the write head and proposes write equalization as a solution.

The European Patent Application 96202427.9, not published at the time of filing of the present Application, corresponding to U.S. patent application Ser. No. 08/909, 919, filed Aug. 12, 1999, now U.S. Pat. No. 6,091,558, proposes a write compensation which enables an arbitrary number of time shifts to be selected for the compensation of the time shift caused both by demagnetization effects and by the limited bandwidth of the recording channel. This write precompensation circuit utilizes, for example, a transversal filter which, for any combination of a number of preceding symbol values, supplies a signal by means of which a given time delay can be obtained for a symbol to be recorded. In this prior proposal, allowance is made for four preceding symbols and one future symbol for the effect caused by the limited bandwidth.

However, the effect of the bandwidth limitation can be caused by a substantially larger number of preceding symbols which, if allowance is to be made for this in the prior-art device, would render this device quite extensive and, consequently, intricate.

SUMMARY OF THE INVENTION

It is an object of the invention to provide a device by means of which it is possible, in a simple manner, to allow for a large number of symbol values which precede a transition to be recorded, this device being usable alone or in combination with an existing precompensation device adapted to allow for a limited number of preceding symbol values.

To this end, in accordance with a first aspect of the invention, a device of the type defined in the opening paragraph, is characterized in that the signal path between the input and the output includes a series arrangement of a filter circuit and a hysteresis circuit, the hysteresis circuit receiving the output signal of the filter circuit and supplying a binary signal as its output signal.

For any phase $\overline{\psi}$ the filter, preferably complies with:

$$\frac{1}{\mu}(h(i+\overline{\psi})T) \cong \begin{cases} 0 & \text{for } i < 0, \\ \beta & \text{for } i = 0, 1, \text{ and} \\ -c_{i-1} & \text{for } i \geq N+2 \end{cases}$$

where
$\mu = T[h(\overline{\psi}T) - h((1+\overline{\psi})T)]$;
T=the pulse width of the data signals;
h=(c * w)(t) where * is a linear convolution;
w(t)=the impulse response of the filter;
c(t)=1 for t∈[0,T] and c(t)=0 elsewhere;
h'=dh/dt;
β=an arbitrary positive constant;
N=a non-negative integer; and
$c_j$=a weighting factor for the degree of precompensation for the influence of a data bit $b_{k-i}$.

In accordance with a second aspect of the invention, an Nth-order precompensation device, which is known per se, is arranged between the input of the device and the input of the filter.

Since, in accordance with the invention, use is made of the series arrangement of a filter circuit and a hysteresis circuit, particularly a slicer, the problems described above with reference to the solution proposed by Kato et al. do not occur. The voltage peaks in the write signal are limited by the hysteresis circuit before the signal is applied to the write head, so that the voltage cannot be clipped, even when the high frequencies are boosted. In fact, in accordance with the invention, compensation is no longer effected by voltage levels but by a shift in time.

BRIEF DESCRIPTION OF THE DRAWINGS

The invention will now be described in more detail with reference to the drawings. In the drawings:

FIGS. 1a–1g illustrate how non-linear bit shifts arise;

FIGS. 2a–2c illustrate a bit shift caused by the bandwidth limitation;

FIG. 3 shows a block diagram of an embodiment of a device in accordance with the invention; and FIG. 4 shows, diagrammatically, a $2^{nd}$ order filter which can be used in the device shown in FIG. 3.

DESCRIPTION OF THE PREFERRED EMBODIMENTS

The two effects which can lead to non-linear bit shifts and which can be counteracted by the write precompensation device in accordance with the invention will now be explained briefly with reference to FIGS. 1a–1g and 2a–2c.

First of all, the effect which causes non-linear bit shifts as a result of demagnetization effects is described. Such demagnetization effects result in a signal transition, hereinafter referred to as transition, to be recorded with a delay if no transition occurred in the preceding symbol interval and is recorded prematurely if a transition occurred in the preceding symbol interval and no transition occurred in the symbol interval preceding this last-mentioned interval.

FIG. 1a shows a reference pattern of symbol values as a function of time, in which no shift occurs because the transitions occur perfectly regularly. The symbols are referenced $a_{k+j}$, where j=−n . . . −1, 0, 1 . . . n. The symbol length is T. The shift of the transition from $a_k$ to $a_{k+1}$ is considered. It is to be noted that in FIGS. 1b–1d the bit shifts are shown to an exaggerated scale. Moreover, it is to be noted that hereinafter the symbol ⊕ represents an "exclusive-or" operation.

FIG. 1b shows the situation in which $a_{k-1} \neq a_{k+1}$. The transition is shifted to the right by a time $t_{s1}$ because, after a "long" period with symbols having a first bit value, a transition to the other, second bit value is counteracted by the magnetic medium and is consequently recorded with a delay. In mathematical terms, the precompensation can be expressed as $dt = -(a_{k+1} \oplus a_{k-1})t_{s1}$.

FIG. 1c shows the situation in which $a_{k-2} \neq a_k$. As a result of this, the transition is shifted to the left by a second time $t_{s2}$ because a transition from a second bit value back to a first bit value, after a "long" period with symbols having a first bit value, is promoted by the magnetic medium and is thus recorded earlier. The required precompensation can be expressed as $dt = (a_k \oplus a_{k-2})t_{s2}$.

The total precompensation required for both effects just described is primarily a linear combination of the individual contributions and is consequently given by $$dt = (a_{k+1} \oplus a_{k-1})t_{s1} + (a_k \oplus a_{k-2})t_{s2} \qquad (1)$$

In practice, use is often made of NRZ data symbols $b_k$ in the alphabet {−1,1}. These are related with the data symbols $a_k$ in accordance with $b_k = 2a_k - 1$ so that $b_k = -1$ if $a_k = 0$ and $b_k = 1$ if $a_k = 1$. Using this relationship between $b_k$ and $a_k$, it is evident that $(a_{k+i} \oplus a_{k+j}) = (1 - b_{k+i}b_{k+j})/2$, so that Eq. (1) may be rewritten as follows:

$$dt = 0.5 [t_{s2} - t_{s1}] + 0.5\ b_{k+1}b_{k-1}t_{s1} - 0.5\ b_k b_{k-2}t_{s2} \qquad (2)$$

The term $0.5[t_{s2} - t_{s1}]$ represents a constant delay which is left out of consideration for the remainder because only the shift of transitions with respect to one another is relevant. Since dt represents a transition between $b_k$ and $b_{k+}$, it holds, when such a transition occurs, which is situation under consideration here, that $b_k = -b_{k+1}$ so that dt, after deletion of the constant delay $0.5[t_{s2} - t_{s1}]$, may be written as $$dt = -0.5\ b_k[b_{k-1}t_{s1} + b_{k-2}t_{s2}] \qquad (3)$$

Non-linear bit shifts as a result of the limited bandwidth of the recording channel will be explained with reference to FIGS. 2a–2c is a highly diagrammatic representation of a recording channel for the recording of data on a magnetic medium. The NRZ data signal $b_k$, shown in FIG. 2b, is applied to a preamplifier 21 and is applied to a write head 23 via a connection 22 having a given self-inductance. The magnetic field $H_g$ generated by the write head 23 is shown in FIG. 2c. Due to the hysteresis effect, the magnetization M of the medium 24 is not inverted until the magnetic field strength $H_g$ exceeds a threshold value $H_{th}$. This means that the actual recording of the transition in $b_k$ in FIG. 2b does not result in an actual magnetic recording by a reversal of the magnetic field until a later instant $t_s$. Moreover, the inertia in the variation of the field strength $H_g$ will often result in $H_g$ not yet having reached its final value when subsequent data transitions occur, which gives rise to interference with the response of $H_g$ to these subsequent transitions. As described above, this interference leads to bit shifts similar to the demagnetization effects described hereinbefore. At high data rates, this interference may cover many symbol intervals. In terms of the description of Eq. (3), this large storage length requires that bits preceding $b_{k-2}$ should also contribute to the precompensation. Therefore, the total precompensation required has the following structure:

$$dt = -b_k [b_{k-1} c_1 + b_{k-2} c_2 + b_{k-3} c_3 + b_{k-4} c_4 \ldots ] \quad (4)$$

where $c_1$, $c_2$, $c_3$, etc., represent weighting factors which dictate the degree of precompensation of the non-linear bit shifts as a result of the bits $b_{k-1}$, $b_{k-2}$, $b_{k-3}$ . . . For completeness' sake, it is mentioned that these weighting factors are generally non-negative.

The above description of the value of dt deviates from the description common in the literature for the time shift necessary to achieve first-order and second-order precompensation for the bit shifts, referred to as $\epsilon_1$ and $\epsilon_2$ in the literature. However, it can be demonstrated that there is a direct relationship between, on the one hand, $\epsilon_1$ and $\epsilon_2$ and, on the other hand, $t_{s1}$ and $t_{s2}$. This will be explained with reference to FIGS. 1e–1g. For a frequently used description of $\epsilon_1$ and $\epsilon_2$ reference, can be made to D. Palmer, P. Ziperovich, R. Wood and T. D. Howell, "Identification of Nonlinear Write Effects Using Pseudorandom Sequences", IEEE Trans. Magn. Vol. MAG-23, No. 5 pp. 2377–2379, September 1987, particularly the Appendix.

FIG. 1e shows a single transition from $b_k$ to $b_{k+1}$ for an NRZ signal $b_{k+1} = \epsilon(-1,1)$, this transition being considered hereinafter. Furthermore, use will be made of transition symbols $q_{k+i}$ with:

$$q_{k+1} = \epsilon(-2, 0, 2) \text{ where } q_k = b_k - b_{k-1} \quad (5)$$

From Eq. (5), it can be derived that $q_{k+1} = 2$ for a rising transition, $q_{k+1} = -2$ for a falling transition, and $q_{k+1} = 0$ when there is no transition.

FIG. 1f illustrates the usual method of describing the first-order bit shift $\epsilon_1$, which is based on a constant signal $b_{k+i} = -1$ of $+1$ ($i \neq 0$) with a single symbol $b_k$ of the length of a symbol interval, having a value opposite to that of the constant signal.

FIG. 1g illustrates the usual method of describing the second-order bit shift $\epsilon_2$, which is based on a constant signal $b_{k+i} -1$ or $+1$ ($i \neq 0$, $i \neq 1$) with two symbols $b_k$ and $b_{k+1}$ of the length of a symbol interval, both having a value opposite to that of the constant signal.

In the above-mentioned article by Palmer, Ziperovich, Wood and Howell, it is set forth that for the compensation of the time shift $\epsilon_1$, a precompensation $\Delta_1$ is required in accordance with $$\Delta_1 = -\varepsilon_1 \frac{q_{k+1} \, q_k}{4}$$

In this article, it is also set forth that for the precompensation for $\epsilon_2$, it holds that:

$$\Delta_2 = -\varepsilon_2 \frac{q_{k+1} \, q_{k-1}}{4}$$

The total precompensation that is required is therefore:

$$\Delta_{tot} = -\frac{q_{k+1}}{4} \{\varepsilon_1 q_k + \varepsilon_2 q_{k-1}\} \quad (6)$$

From Eqs. (5) and (6), it follows that:

$$\Delta_{tot} = -\frac{q_{k+1}}{4} \{\varepsilon_1(b_k - b_{k-1}) + \varepsilon_2(b_{k-1} - b_{k-2})\} \quad (7)$$

$$= -\frac{q_{k+1}}{4} \{\varepsilon_1 b_k - (\varepsilon_1 - \varepsilon_2) b_{k-1} - \varepsilon_2 b_{k-2}\}$$

$$= C + \frac{q_{k+1}}{2} \{\frac{\varepsilon_1 - \varepsilon_2}{2} b_{k-1} + \frac{\varepsilon_2}{2} b_{k-2}\}$$

where $$C = -\frac{\varepsilon_1}{4}(q_{k+1} b_k)$$

For the present transition between $b_k$ and $b_{k+1}$, it holds that $q_{k+1} b_k = -2$ regardless of the polarity of $b_k$. This means that $C = \epsilon_1/2$, i.e., C represents a constant precompensation which applies to all transitions and mall therefore be disregarded because only the shift of transitions relative to one another is relevant.

For the present transition between $b_k$ and $b_{k+1}$ it holds that $q_{k+1}/2 = -b_k$ so that, after dropping the constant C, it holds that $$\Delta = -b_k \left\{ \frac{b_{k-1}(\varepsilon_1 - \varepsilon_2)}{2} + b_{k-2} \frac{\varepsilon_2}{2} \right\} \quad (8)$$

This expression truly has the same structure as Eq.(4), in which $c_1$ and $c_2$ can be identified as $(\epsilon_1-\epsilon_2)/2$ and $\epsilon_2/2$, respectively.

FIG. 3 illustrates, diagrammatically, how, in accordance with the invention, a compensation of non-linear bit shift caused by a very large number of preceding bits can be achieved. The circuit comprises an analog filter 20 and a hysteresis circuit, such as a slicer, 25. The circuit of FIG. 3 is included in the input circuit of a write head.

The filter 20 has an impulse response w(t) and the input signal x(t) is a continuous binary data signal, such as the signal $b_{k+i}$ of FIGS. 1a–1g. The output signal y(t) of the filter is non-binary and the zero crossings of y(t), which exhibit data-dependent shifts with respect to those of x(t), are detected by the slice 25, which provides the binary output signal s(t) of the write precompensation circuit. Due to the causality of the write precompensation filter, shifts in the transitions are wholly defined by the preceding data symbols. The filter determines both the time covered by the memory and the magnitude of the shifts and can be designed, for example, in the manner stated below. In practice, a third-order or fourth-order filter will be adequate. As a result of this low order, the circuit can remain simple and is very suitable for implementation in an integrated circuit. The required bandwidth of the filter is generally of the order of magnitude of the data rate 1/T, as a result of which the data rates can, in principle, be high. For implementation techniques for third-order and fourth-order filters, reference can be made to the article "A practical method of designing RC active filters" by R. P. Sallen and E. L. Key in IRE Transactions on Circuit Theory, March 1955, pages 74–85, or to the article "Generation of continuous-time two integrator loop OTA filter structures" by E. Sánchez-Sinencio et al in IEEE Transactions on Circuits and Systems, Vol. 35, No. Aug. 8, 1988, pages 936–946.

The filter order can be lower if the circuit of FIG. 3 is used in conjunction with a conventional first-order or second-order write precompensation circuit or a write precompensation circuit of the type described in the above-mentioned European Patent Application 96202427.9, not yet published at the date of filing of the present Application, for signal transitions which are not compensated by the conventional circuit. A filter having two real poles and a zero point at DC, is, in principle, adequate for such a purpose. However, the zero point at DC results in y(t) decreasing to zero during the long strings of zeros or ones, which complicates a reliable detection of zero crossings. In order to preclude this problem, the zero point can be shifted to a fraction of the pole of the lowest value. This yields a transfer function which complies with:

$$W(f) = \alpha \frac{1 + j\frac{f}{\beta f_1}}{\left(1 + j\frac{f}{f_1}\right)\left(1 + j\frac{f}{f_2}\right)} \quad (9)$$

where $\alpha$ is an arbitrary gain factor, $f_1$ and $f_2$ ($f_1 < f_2$) defining the locations of the poles and $\beta$ is a fraction define the location of the zero point with respect to that of the first pole. The transfer function of Eq.(9) can be realized effectively by the circuit in accordance with FIG. 4.

FIG. 4 shows a voltage-current converter 22 which receives the signal x(t) and supplies a binary current i(t). This current is injected into the node between the capacitor $C_1$ and the resistor $R_1$, and is taken from the node between the capacitor $C_2$ and the resistor $R_3$. The output signal of the filter is the voltage across $C_2$. Typically, it holds that $\beta << 1$ and $f_1 << f_2$. In the present case, the following applies:

$$\beta \cong \frac{R_3}{R_2}, \quad f_1 \cong \frac{1}{2\pi R_1 C_1}, \quad \text{and} \quad f_2 \cong \frac{1}{2\pi R_2 C_2} \quad (10)$$

The analog filter of FIG. 4 has been optimized for a representative write path of limited bandwidth, such as a magnetic write head. Table 1 list the residual bit shifts observed in the recorded data pattern for different filter configurations at three different bit rates. The Table also gives the optimum values for $C_1$ and $C_2$ for the resistance values $R_1 = 4k\Omega$, $R_2 = 300\Omega$ and $R_3 = 100\Omega$.

TABLE 1

| 1/T (Mb/s) | no precompensation | O1 | O2 | O1 + S | O2 + S | $C_1$ (pF) | $C_2$ (pF) |
|---|---|---|---|---|---|---|---|
| 100 | 21 | 12 | 10 | 6.2 | 6.2 | 9.4 | 3.1 |
| 150 | 36 | 24 | 20 | 12 | 11 | 6.5 | 3.9 |
| 200 | 41 | 34 | 29 | 19 | 16 | 4.9 | 3.9 |

The Table lists the residual peak-peak bit shifts in per cent of a symbol interval at bit rates of 100, 150 and 200 Mb/s.

The column O1 applies to a conventional first-order write compensation device; the column O2 applies to a conventional second-order write compensation device, and the columns O1+S and O2+S apply to the combination of a conventional first-order and second-order write compensation device, respectively, together with the device in accordance with the invention, as shown in FIGS. 3 and 4.

As is apparent from the Table, the resulting effect is very favorable, particularly if a conventional circuit arrangement is combined with the filter in accordance with the invention. The optimum value of $C_1$ depends strongly on the data rate. However, it is yet possible to use a fixed filter dimensioning for all data rates, if the component values are optimized for the highest data rate, where the non-linear bit shifts are most pronounced. At lower data rates, the values will then be slightly sub-optimum, but the residual bit shifts will decrease as the data rate decreases.

In order to be suitable for write precompensation, it is necessary that the device in accordance with the invention can produce transition shifts having the structure in accordance with Eq.(4). Hereinafter, it will be demonstrated by means of an approximative analysis, that shifts actually have the structure in compliance with (4), provided that the filter 20 in FIG. 3 is of a suitable design.

Data symbols $b_k \in \{-1, 1\}$ are transmitted by means of rectangular pulses c(t-kT) having a width T (c(t)=1 for $t \in [0,T]$ and c(t)=0 elsewhere), in a manner as shown in FIGS 1e–1g. The filter 20 produces an output signal in compliance with:

$$y(t) = \sum_{k=-\infty}^{\infty} b_{k+1} h(t - kT) \quad (11)$$

where $h(t) \underline{\Delta} (c * w)(t)$. Here, "$\underline{\Delta}$" means by definition and "*" denotes a linear convolution.

First of all, a rising transition between the instants k and k+1 is considered ($b_k=1$; $b_{k+1}=1$). In response to this, transition y(t) should rise and pass through zero. Now an instant $t_k^\psi \underline{\Delta} (k+\psi)T$ is considered, where $\psi$ is a prescribed sampling phase, which is normalized in symbol intervals T. If h(t) is causal, it holds that:

$$y(t_k^\psi) = h_0^\psi - h_1^\psi + \sum_{j \geq 1} b_{k-j} h_{j+1}^\psi \quad (12)$$

in which $h_j^\psi \underline{\Delta} h(j+\psi)T$. For data $b_k$ having an average value=0, the average contribution to $y(t_k^\psi)$ of the bits $b_{k-1}$, $b_{k-2}$, ... is equal to zero, so that the average phase $\overline{\psi}$ for which the zero crossings occur is the phase for which $h_0^{\overline{\psi}} = h_1^{\overline{\psi}}$; it is then evident that:

$$y(t_k^{\overline{\psi}}) = \sum_{j \geq 1} b_{k-j} h_{j+1}^{\overline{\psi}} \quad (13)$$

If y is positive for $t = t_k^\psi$, the zero crossing must have appeared earlier, which means that the shift of the transition, designated as $\Delta_k^P$, will be negative. When, in FIG. 3, a hysteresis circuit in the form of a slicer is used, this shift will dictate the degree of precompensation provided by the device in accordance with FIG. 3.

In the first approximation, $\Delta_k^P$ depends linearly on $y(t_k^{\overline{\psi}})$ in accordance with $\Delta_k^P \cong -\mu^{-1} y(t_k^{\overline{\psi}})$, in which $\mu$ represents the average slope of positive-going zero crossings of y, that is to say, $\mu = T[h'(\overline{\psi}T) - h'((1+\overline{\psi})T)]$. Here, $h'(\overline{\psi}T)$ is the first derivative of $h(\overline{\psi}T)$.

For a falling data transition ($b_k=1$, $b_{k+1}=-1$), the average phase $\bar{\psi}$ of zero crossings does not change, but in that case, a positive value of $y(t_k)$ means that the zero crossing has not yet occurred, which means that $\Delta_k^P$ is positive.

This sign reversal can be allowed for by means of a multiplication factor $b_k$, so that $$\Delta_k^p = b_k \sum_{j \geq 1} b_{k-j} \mu^{-1} h_{j+1}^{\bar{\psi}} \tag{14}$$

This expression is valid both for the falling and the rising transitions.

As regards the filter design the following is to be borne in mind. The shift in accordance with Eq.(14) has the same structure as the desired precompensation in accordance with Eq.(4). More in particular, desired partial shifts c1, c2, . . . in accordance with Eq.(4) can apparently be realized by designing the filter 20 in FIG. 3 in such a manner that $\mu^{-1} h_{j+1}^{\bar{\psi}} = -c_j$ for j=1,2, . . .

Moreover, the sample values $h_0^{\bar{\psi}}$ en $h_1^{\bar{\psi}}$ should be equal to one another, as is apparent from the foregoing. Furthermore, the two sample values should be positive because in the foregoing it has been assumed that a rising data-transition results in a rising transition of y. The above derivation does not impose any requirements on the amplitude of the two sample values, so that, in principle, this amplitude can be chosen freely. Sample values $h_j^{\bar{\psi}}$ for j<0 are all zero on account of the presumed causality of the filter. Thus, summarizingly, the filter should be designed in such a manner that $$\frac{1}{\mu}(h(i+\bar{\psi})T) \cong \begin{cases} 0 & \text{for } i < 0, \\ \beta & \text{for } i = 0, 1, \text{ and} \\ -c_{i-1} & \text{for } i \geq N+2 \end{cases} \tag{15}$$

where $\beta$ is an arbitrary positive constant. In order to achieve this goal, the poles and zero points of the filter are optimized together with the sampling phase $\bar{\psi}$. The program for designing the filter can be based on a norm, for example, the Euclidean distance between the left-hand and right-hand terms of Eq.(15). If the filter is used as an addition to an $N^{th}$-order conventional write precompensation scheme, the components i=2 . . . N+1 may be excluded from Eq.(15) of said norm.

As will have become apparent from the foregoing, it is an important aspect of the present invention that by means of the output signal dt, a continuum of time shifts can be realized rather than, as in the prior art, merely a choice being made from a limited number of delay values. The signal dt can be amplitude discrete, though it can also be analog, in which last-mentioned case, the number of available time shifts is unlimited.

What is claimed is:

1. A device for write precompensation of data signals to be recorded on a magnetic medium, said device having an input for receiving input data signals and an output for supplying output data signals to be recorded, at least a plurality of signal transitions in output data signals being delayed upon recording with respect to corresponding signal transitions in the input data signal, characterized in that in order to compensate for said delay, said device comprises, in the signal path between the input and the output, a series arrangement of a filter circuit and a hysteresis circuit, said hysteresis circuit receiving an output signal of the filter circuit and supplying a binary signal as an output signal.

2. The device as claimed in claim 1, characterized in that for any phase $\bar{\psi}$, the filter circuit complies with:

$$\frac{1}{\mu}(h(i+\bar{\psi})T) \cong \begin{cases} 0 & \text{for } i < 0, \\ \beta & \text{for } i = 0, 1, \text{ and} \\ -c_{i-1} & \text{for } i \geq N+2 \end{cases}$$

where $\mu = T\{h'(\bar{\psi}T) - h'((1+\bar{\psi})T)\}$;

T=the pulse width of the data signals;

h=(c*w)(t) where * is a linear convolution;

w(t)=the impulse response of the filter;

c(t)=1 for t∈{0,T} and c(t)=0 elsewhere;

h'=dh/dt;

$\beta$=an arbitrary positive constant;

N=a non-negative integer; and $c_i$=a weighting factor for the degree of precompensation for the influence of a data bit $b_{k-i}$.

3. The device as claimed in claim 1, characterized in that the device further comprises an $N^{th}$-order precompensation device arranged in the signal path between the input of the device and the output of the filter circuit.

4. The device as claimed in claim 1, characterized in that the hysteresis circuit comprises a slicer.

5. The device as claimed in claim 2, characterized in that the filter circuit is of the 2nd-order.

* * * * *